United States Patent
Racape et al.

(10) Patent No.: US 12,063,351 B2
(45) Date of Patent: Aug. 13, 2024

(54) WIDE ANGLE INTRA PREDICTION WITH SUB-PARTITIONS

(71) Applicant: INTERDIGITAL MADISON PATENT HOLDINGS, SAS, Paris (FR)

(72) Inventors: Fabien Racape, San Francisco, CA (US); Gagan Rath, Bhubaneswar (IN); Fabrice Urban, Thorigne Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 266 days.

(21) Appl. No.: 17/603,039

(22) PCT Filed: Apr. 9, 2020

(86) PCT No.: PCT/US2020/027402
§ 371 (c)(1),
(2) Date: Oct. 12, 2021

(87) PCT Pub. No.: WO2020/210443
PCT Pub. Date: Oct. 15, 2020

(65) Prior Publication Data
US 2022/0191474 A1 Jun. 16, 2022

(30) Foreign Application Priority Data
Apr. 12, 2019 (EP) .................................... 19305478

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176; H04N 19/593
See application file for complete search history.

(56) References Cited

U.S. PATENT DOCUMENTS

2013/0107950 A1* 5/2013 Guo ..................... H04N 19/122
375/E7.243
2015/0264404 A1 9/2015 Hannuksela
(Continued)

FOREIGN PATENT DOCUMENTS

EP 3457692 3/2019
RU 2653299 5/2018

OTHER PUBLICATIONS

Racape et al., CE3-related: Wide-Angle Intra Prediction for Non-Square Blocks, 11. JVET Meeting; Jul. 11, 2018-Jul. 18, 2018, Ljubljana, No. JVET-K0050_r1, pp. 1-7, retrieved from the internet: URL:http://phenix.int-evry.fr/jvet/doc_end_user_/documents/11_Ljubljana/wg11/JVET-K0500-v2.zip.

(Continued)

*Primary Examiner* — Jared Walker
(74) *Attorney, Agent, or Firm* — Ronald Kolczynski

(57) ABSTRACT

A method and apparatus for performing prediction for encoding or decoding uses intra prediction with sub-partitions. The sub-partitions are oriented either horizontally or vertically and can use wide-angle modes different than that of the video block they originate from. Reference samples for a sub-partition are those of the video block when reference samples for the sub-partition are not available, such as due to direction. In an embodiment, when a sub-partition is square, conventional intra prediction directions (Continued)

are used. Reference samples can be used from a block above and right of the video block or left and below the video block using a mapping along a prediction direction, vertically, or horizontally.

19 Claims, 18 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2018/0176587 A1* | 6/2018 | Panusopone | H04N 19/63 |
| 2018/0205972 A1* | 7/2018 | Piao | H04N 19/13 |
| 2018/0332284 A1* | 11/2018 | Liu | H04N 19/13 |

OTHER PUBLICATIONS

De-Luxan-Hernandez et al., Non-CE3: ISP with Independent Sub-Partitions for Certain Block Sizes, 14. JVET Meeting; Mar. 19, 2019-Mar. 27, 2019; Geneva; (The Joint Video Exploration Team Searched of ISO/IEC JTC1/SC29/WG11 and ITU-T SG. 16), No. JVET-N0372 Mar. 12, 2019 (Mar. 12, 2019), Retrieved from the Internet: URL:http://phenix.int-evry.fr/jvet/doc enduser/documents/14 Geneva/wg11/JVET-N0372-vl.zip JVET-N0372-v1.docx [retrieved on Mar. 12, 2019].

Filippov et al., CE3-Related: Reference Sample Processing for Wide-Angle Intra-Prediction, 11. JVET Meeting; Jul. 11, 2018-Jul. 18, 2018, Ljubljana; (The Joint Video Exploration Team of ISO/IEC JTC1/SC29/WG11 and ITU-T SG. 16 ), No. JVET-K0059, Jul. 9, 2018 (Jul. 9, 2018), Retrieved from the Internet:URL:http://phenix.int-evry.fr/jvet/doc_enduser/documents/11 Ljubljana/wg11/JVET-K0059-v2.zip JVET-K0059 r2.docx[retrieved on Jul. 9, 2018].

Heo et al., Non-CE3: Harmonization Between WAIP and ISP, 14. JVET Meeting, Mar. 19, 2019-Mar. 27, 2019, Geneva; (The Joint Video Exploration Teamof ISO/IEC JTC1/SC29/WG11 and ITU-T SG.16), No. JVET-N0452, Mar. 18, 2019 (Mar. 18, 2019), Retrieved from the Internet: URL:http://phenix.int-evry.fr/jvet/doc enduser/documents/14Geneva/wg11/JVET-N0452-v2.zip JVET-N0452 v2.docx[retrieved on Mar. 18, 2019].

De-Luxan-Hernandez et al., CE3: Intra Sub-Partitions Coding Mode (Tests 1.1.1 and 1.1.2), 13, JVET Meeting; Jan. 9, 2019-Jan. 18, 2019, Marrakech, (The Joint Video Exploration Team of ISO/IEC JTC1/SC29/WG11 and ITU-T SG. 16), No. JVET-M0102, Jan. 17, 2019 (Jan. 17, 2019), Retrieved from the Internet:URL:http://phenix.int-evry.fr/mpeg/doc enduser/documents/13_Marrakech/wg11/JVET-M0102-v7.zip [retrieved on Jan. 17, 2019].

Zhao et al., CE3-related: Harmonization between ISP and WAIP, Joint Video Experts Team (JVET)of ITU-T SG 16 WP 3 and ISO/IEC 1/SC 29/WG 11, JVET-N0427_r1, 14th Meeting: Geneva, CH, Mar. 2019, pp. 1-3.

Van Der Auwera, et al., "Description of Core Experiment 3: Intra Prediction and Mode Coding", Joint Video Experts Team (JVET) of ITU-T SG 16 WP 3 and ISO/IEC JTC 1/SC 29/WG 11, Document: JVET-K1023-v3, 11th Meeting, Ljubljana, Slovenia, Jul. 10, 2018, 35 pages.

Zhao, et al., CE3-related: Wide angular intra prediction for non-square blocks, Joint Video Exploration Team (JVET) of ITU-T SG 16 WP 3 and ISO/IEC JTC 1/SC 29/WG 11, JVETK0289_v2, 11th Meeting: Ljubljana, SI, Jul. 2018, pp. 1-4.

Ma, et al., Non-CE3: Unification on WAIP for normal and ISP intra prediction, Joint Video Experts Team (JVET) of ITU-T SG 16 WP 3 and ISO/IEC JTC1/SC 29/WG 11, JVET-N0339, 14th Meeting: Geneva, CH, Mar. 2019, pp. 1-4.

* cited by examiner

WIDE ANGLE INTRA PREDICTION WITH SUB-PARTITIONS

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

Drawbacks and disadvantages of the prior art may be addressed by the general aspects described herein, which are directed to block shape adaptive intra prediction directions in encoding and decoding.

According to a first aspect, there is provided a method. The method comprises steps for determining an intra prediction direction for a rectangular sub-partition of a video block based on the dimensions of the sub-partition when a ratio of dimensions of said sub-partition is within a particular range, and based on dimensions of the video block when a ratio of dimensions of said sub-partition is out of said particular range; mapping reference samples from above right or below left of the video block as above right or below left reference samples for prediction of said sub-partition of the video block; predicting a sample of the rectangular sub-partition using reference samples from a row above the video block or reference samples from a column left of the video block, wherein a number of reference samples in the row above the video block or the column left of the video block are determined based on dimensions of the rectangular sub-partition; and, encoding the rectangular sub-partition of a video block using said prediction in an intra coding mode.

According to a second aspect, there is provided a method. The method comprises steps for determining an intra prediction direction for a rectangular sub-partition of a video block based on the dimensions of the sub-partition when a ratio of dimensions of said sub-partition is within a particular range, and based on dimensions of the video block when a ratio of dimensions of said sub-partition is out of said particular range; mapping reference samples from above right or below left of the video block as above right or below left reference samples for prediction of said sub-partition of the video block; predicting a sample of the rectangular sub-partition using reference samples from a row above the video block or reference samples from a column left of the video block, wherein a number of reference samples in the row above the video block or the column left of the video block are determined based on dimensions of the rectangular sub-partition; and, decoding the rectangular sub-partition of a video block using said prediction in an intra coding mode.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
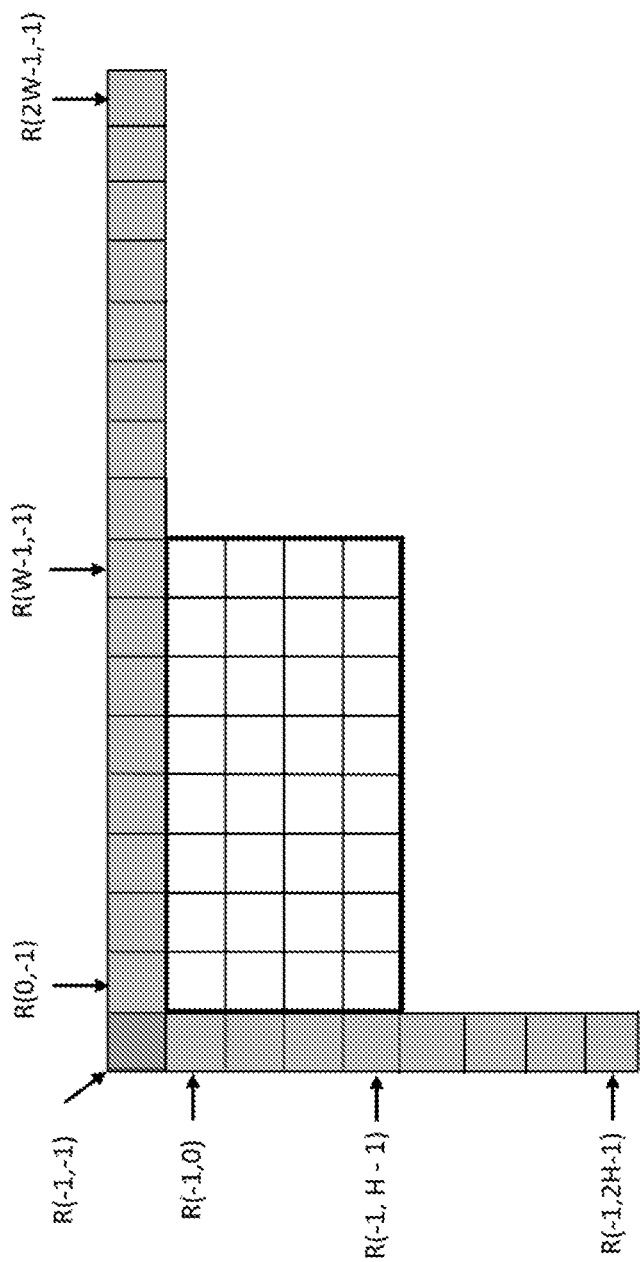
FIG. 1 shows reference samples for intra prediction in VTM.

The embodiments described here are in the field of video compression and relate to video compression and video encoding and decoding.

Versatile Video coding (VVC) test model 4.0 (VTM), supports intra prediction with sub-partitions (ISP) where a target block is encoded with an option of horizontal or vertical sub-partitioning. The prediction for each sub-partition uses the same prediction direction as that for the target coding unit. The sub-partition predictions can be improved by employing the wide-angle prediction adapted to the aspect ratio of each sub-partition independent of the parent coding unit. Secondly, the prediction of a sub-partition uses the decoded pixels in the previous sub-partition as reference samples. As a result, the top-right or the bottom left reference samples for a sub-partition may not be available. The reference samples for the parent CU can be used to improve predictions along directions needing those samples.

In the Versatile Video coding (VVC) test model (VTM), any target block in intra prediction can have one of 67 prediction modes. Like HEVC, one is a PLANAR mode, one is a DC mode, and the remaining 65 are directional modes. The 65 directional modes are chosen from 95 directions, which include the 65 regular angles spanning from 45 degree to −135 degree if the target block is square, and potentially 28 wide angular directions when the block is rectangular. VTM encodes the prediction mode of a block using the Most Probable Mode (MPM) set, which consists of 6 prediction modes. If the prediction mode does not belong to the MPM set, it is truncated-binary encoded with 5 or 6 bits.

Intra prediction in video compression refers to the spatial prediction of a block of pixels using the information from the causal neighbor blocks, that is, the neighboring blocks in the same frame which have already been decoded. This is a powerful coding tool since it allows for high compression efficiency in INTRA frames, as well as in INTER frames whenever there is no better temporal prediction. Therefore, intra prediction has been included as a core coding tool in all video compression standards including H.264/AVC, HEVC, etc. In the following, for explanation purpose, we will refer to the intra prediction in Versatile Video Coding (VVC) software test model (VTM).

In VTM, encoding of a frame of video sequence is based on a quad-tree (QT)/multi-type tree (MTT) block structure. A frame is divided into non-overlapping square coding tree units (CTUs) which all undergo QT/MTT based splitting to multiple coding units (CUs) based on rate-distortion criteria. For easier reference, we will be using the terms "CU" and "block" interchangeably throughout the text.

In Intra prediction, a CU is spatially predicted from the causal neighbor CUs, i.e., the CUs on the top and the left. For that purpose, VTM uses simple spatial models called prediction modes. Based on the decoded pixel values in the top and left CUs, called reference pixels, the encoder constructs different predictions for the target block and chooses the one that leads to the best RD performance. Out of the 95 defined modes, one is a planar mode (indexed as mode 0), one is a DC mode (indexed as mode 1) and the remaining 93 (indexed as mode −14 . . . −1, 2 . . . 80) are angular modes. Out of the 93 angular modes, only 65 adjacent modes are selected for any target CU depending on its shape. The angular modes aim to model the directional structures of objects in a frame. Therefore, the decoded pixel values in the top and left CUs are simply repeated along the defined directions to fill up the target CU. Some prediction modes can lead to discontinuities along the top and left reference boundaries, hence those prediction modes can include a subsequent post-processing, known as position dependent intra prediction combination (PDPC), which aims to smoothen the pixel values along those boundaries.

The intra prediction process in VTM consists of three steps: (1) reference sample generation (2) intra sample prediction and (3) post-processing of predicted samples. The reference sample generation process is illustrated in FIG. 1, which shows reference samples for intra prediction in VTM. H and W represent the height and width of the current block, respectively. For a CU of size H×W, a row of 2 W decoded samples on the top is formed from the previously reconstructed top and top right pixels to the current CU. Similarly, a column of 2 H samples on the left is formed from the reconstructed left and below left pixels. The corner pixel at the top-left position is also used to fill up the gap between the top row and the left column references. If some of the samples on top or left are not available, because of the corresponding CUs not being in the same slice, or the current CU being at a frame boundary, or for some other reason, then a method called reference sample substitution can be performed.

Figure 2:
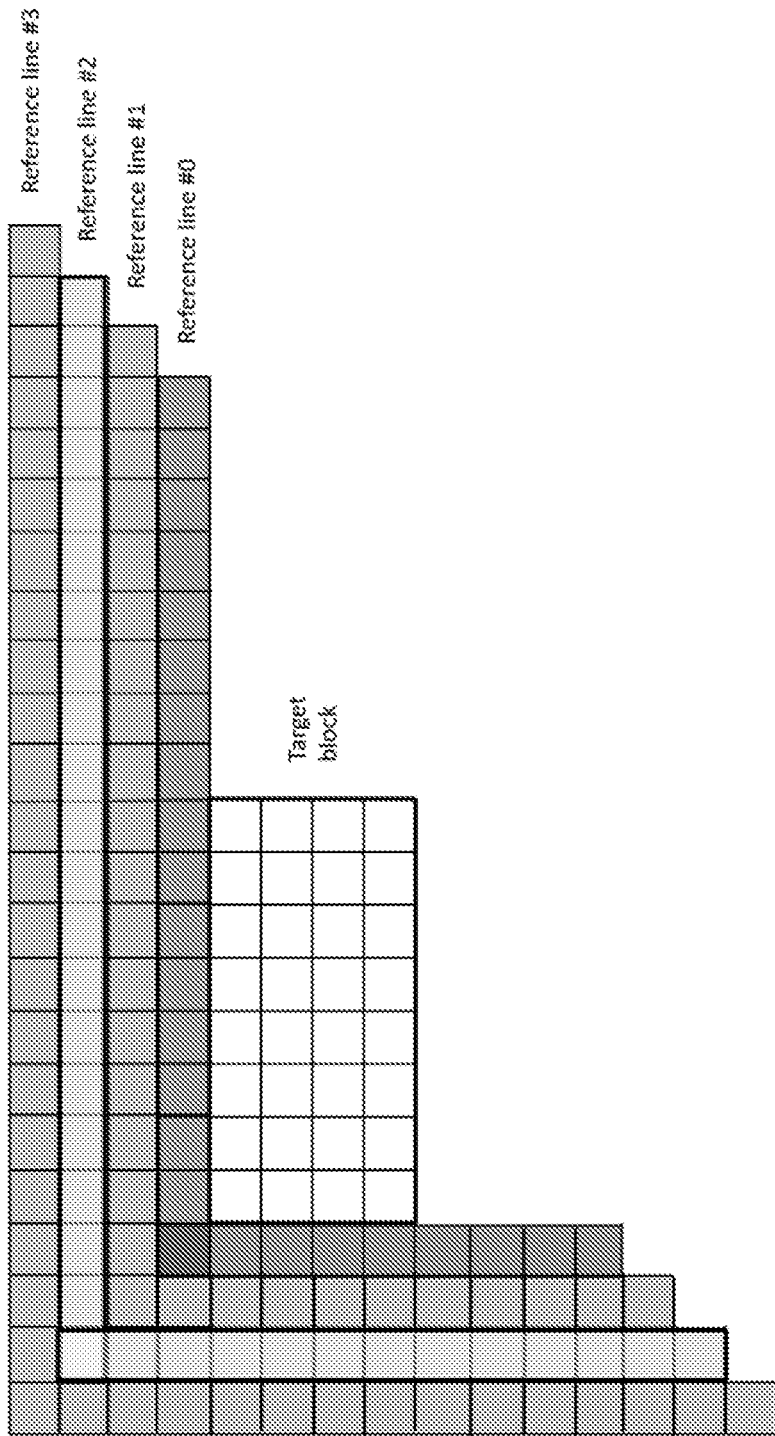
FIG. 2 shows multiple reference lines for intra prediction in VTM.

VTM also supports intra prediction with multiple reference lines (MRL). The idea is to make the prediction based on several sets of reference lines as shown in FIG. 2, and then to choose the reference line giving the best rate-distortion performance. The reference line used is signaled to the decoder with a variable length code.

Figure 3:
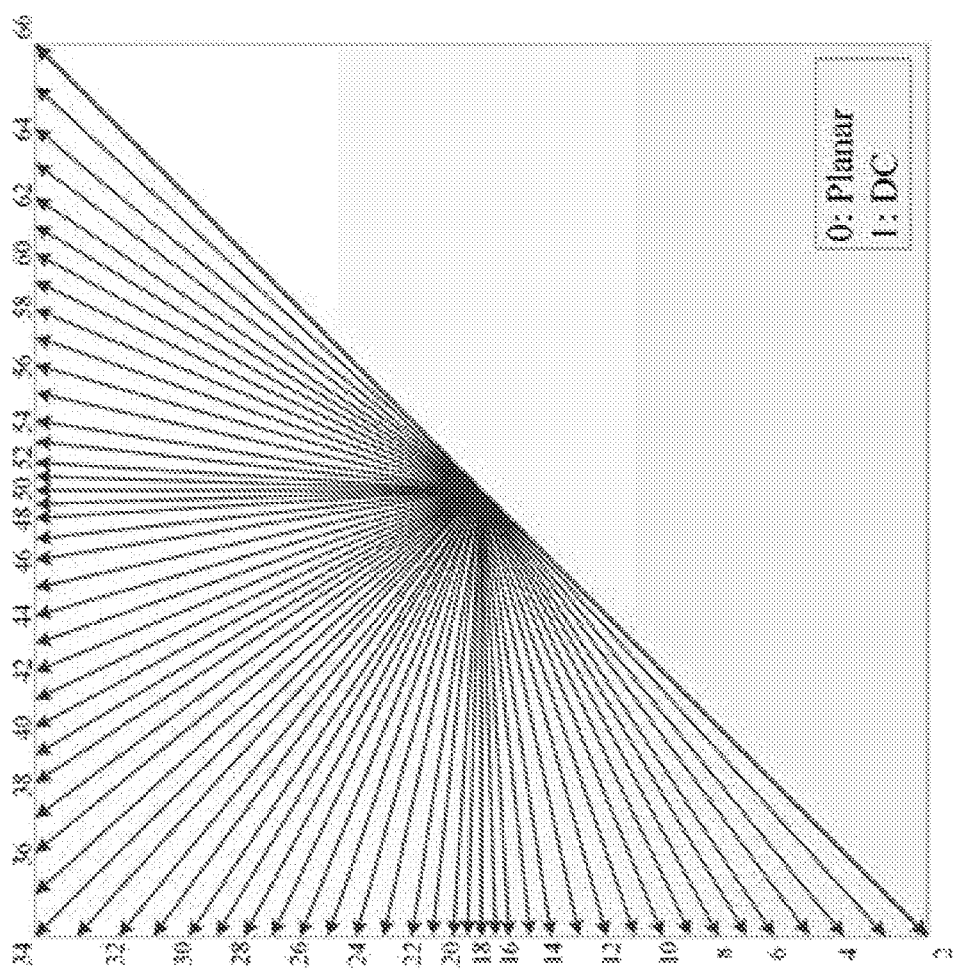
FIG. 3 shows intra prediction directions in VTM for a square target block.

The next step, the intra sample prediction, consists of predicting the pixels of the target CU based on the reference samples. As mentioned before, in order to predict different kinds of content efficiently, VTM supports a range of prediction models. Planar and DC prediction modes are used to predict smooth and gradually changing regions, whereas angular prediction modes are used to capture different directional structures. VTM supports 95 directional prediction modes which are indexed from −14 to −1 and from 2 to 80. For a square CU, only the prediction modes 2-66 are used. These prediction modes correspond to different prediction directions from 45 degree to −135 degree in clockwise direction, as illustrated in FIG. 3, which shows intra prediction directions in VTM for a square target block. In general, non-square blocks can also be used with extended prediction directions, but this figure shows a square block. The numbers denote the prediction mode index associated with the corresponding direction. Modes 2 to 33 indicate horizontal predictions and modes 34 to 66 indicate vertical predictions.

Modes with indexes from −14 to −1 and indexes from 67 to 80 are wide angular modes which are used for rectangular blocks of different shapes. Modes −14 to −1 are defined beyond mode 2 (beyond angle 45 degree) and are used for tall rectangular blocks (blocks with height greater than width). Analogously, modes 67 to 80 are defined beyond mode 66 (beyond angle −135 degree) and are used for flat rectangular blocks (blocks with width greater than height). The number of wide angular modes used for a rectangular block depends on the aspect ratio of the block. In any case, the total number of angular modes used for any block is 65 and the modes are always contiguous in direction.

The general aspects described here aim at improving the prediction efficiency in intra prediction with sub-partitions. First it proposes to predict each sub-partition employing its own wide angle modes than the wide angle mode of the parent coding unit. Second, it also proposes to employ the reference samples of the parent CU for the prediction of a sub-partition when those samples are not available. These two proposals can be incorporated in the current VTM code to improve the coding performance. The added complexity and memory requirements for incorporating these changes are minimal with potential for some coding gain.

In Versatile Video coding (VVC) test model (VTM), encoding of a frame of video sequence is based on a quad-tree (QT)/multi-type tree (MTT) block structure. A frame is divided into non-overlapping square coding tree units (CTUs) which all undergo QT/MTT based splitting to multiple coding units (CUs) based on rate-distortion criteria. In Intra prediction, a CU is spatially predicted from the causal neighbor CUs, i.e., the CUs on the top and the left. For that purpose, VTM uses simple spatial models called prediction modes. Based on the decoded pixel values in the top and left CUs, called reference pixels, the encoder constructs different predictions for the target block and chooses the one that leads to the best RD performance.

In VTM 4.0, a target block has the option of choosing between the intra prediction for the entire CU and the intra prediction with sub-partitions (ISP) of the CU. In the latter prediction, the target CU is divided into two or four equal sized sub-partitions, which are sequentially decoded with one prediction mode. That is, each sub-partition is independently decoded. Thus, a sub-partition can benefit from the availability of the decoded samples from the neighboring sub-partition, which are immediate neighbors of the current sub-partition. This in turn leads to better prediction and thus higher compression efficiency.

VTM 4.0 also supports wide angle intra prediction (WAIP) which allows use of wide angular prediction directions for rectangular CUs. Depending on the aspect ratio of the target block, some regular prediction directions are replaced with the corresponding wide angular directions. The prediction directions have also been modified suitably to adapt to different rectangular block shapes so that the defined prediction directions are aligned over the secondary diagonal of the block. Effectively, by using the wide angles instead of the regular angles, the method aims to provide better prediction leading to higher compression efficiency.

In VTM 4.0, the combination of ISP with WAIP is straight-forward. For each sub-partition in ISP, the prediction direction is the same as the prediction direction of the parent CU. This is, however, not mandatory. Since the sub-partitions are independently decoded, the prediction direction of each sub-partition can be independently decided with WAIP. Secondly, except for the first sub-partition, the remaining sub-partitions use the decoded pixels from the previous sub-partition as reference samples for prediction. This leads to the undesired effect that some reference samples may not be available depending on the prediction direction. This situation can be ameliorated by using the reference samples from the parent CU. Before we describe the proposed modes, we briefly present the ISP and WAIP in VTM 4.0 in the following. For easier reference, we will be using the terms "CU" and "block" interchangeably throughout the text.

Figure 4:
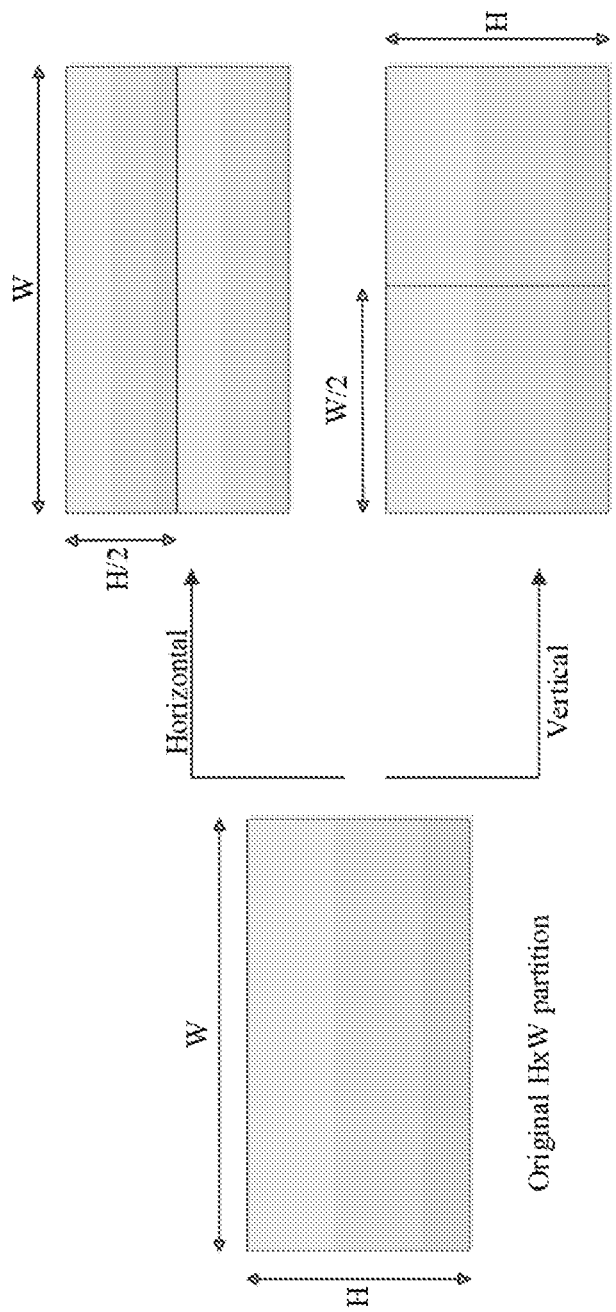
FIG. 4 shows an example of division of 4×8 and 8×4 blocks.
Figure 5:
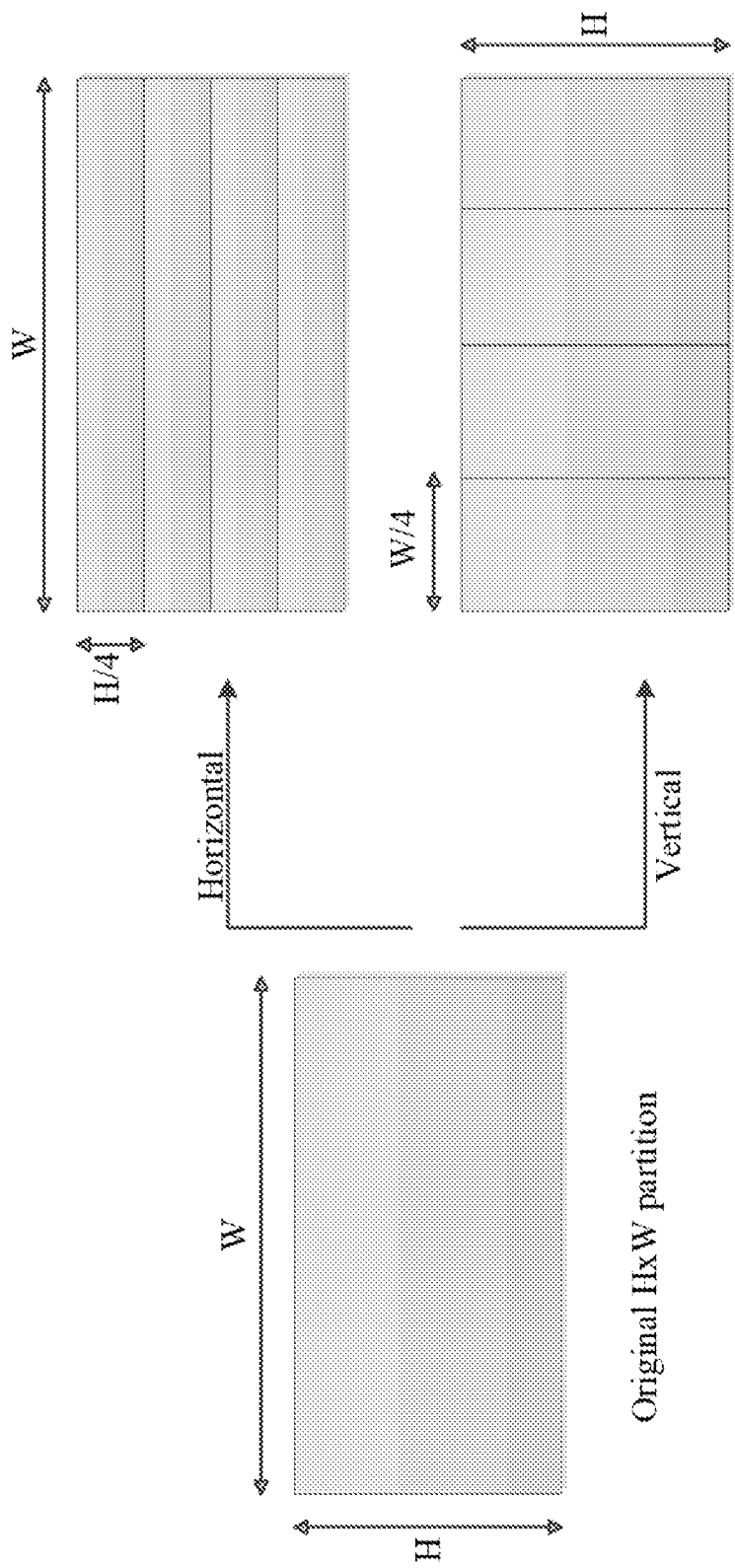
FIG. 5 shows an example of division of all blocks except 4×8, 8×4 and 4×4.
Figure 6:
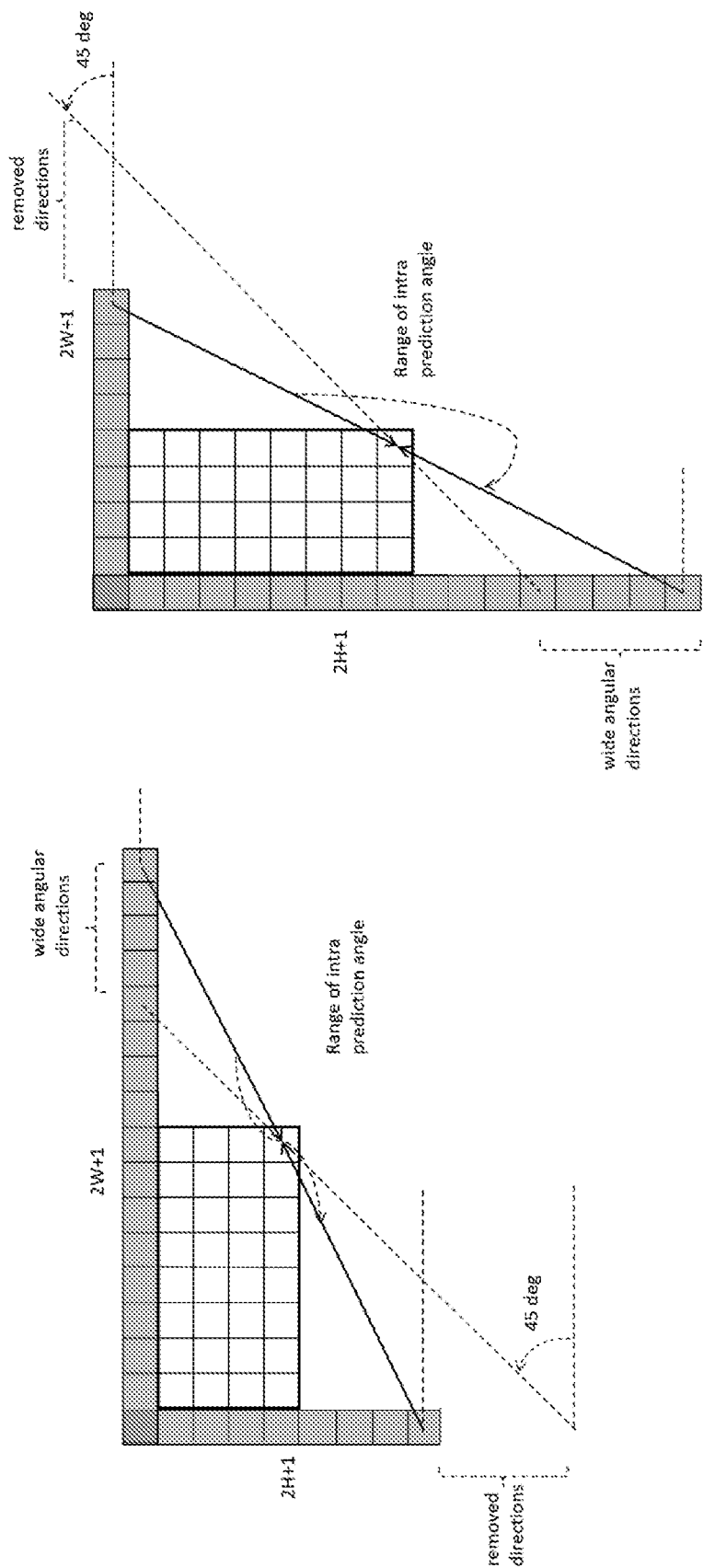
FIG. 6 shows wide angle intra prediction for non-square blocks.

The ISP tool in VTM 4.0 divides luma intra-predicted blocks vertically or horizontally into 2 or 4 sub-partitions depending on the block size. A sub-partition must have at least 16 samples. Therefore, blocks of size 4×4 are not divided into sub-partitions whereas blocks of size 4×8 and 8×4 have only two partitions. Blocks of all other sizes have only four sub-partitions. The sub-partitions can be either horizontal or vertical. A block of size 4×8 can have only two vertical partitions of size 4×4 each whereas a block of size 8×4 can have only two horizontal partitions of size 4×4 each. Similarly, a block of size 4×16, as another example, can have four vertical sub-partitions of size 4×4 each or four horizontal sub-partitions of size 1×16 each. FIG. 4 and FIG. 5 show examples of the two possibilities.

TABLE 1

Number of sub-partitions depending on the block size

| Block Size | Number of Sub-Partitions |
|---|---|
| 4 × 4 | 1 |
| 4 × 8 and 8 × 4 | 2 |
| All other cases | 4 |

For each of these sub-partitions, a prediction is constructed using the decoded prediction mode of the parent CU. This prediction signal is added to the decoded residual signal, which is generated by entropy decoding the coefficients sent by the encoder and then inverse quantizing and inverse transforming them, to reconstruct the pixels in a sub-partition. Except the first sub-partition, the reconstructed values of each sub-partition will be available to generate the prediction of the next one.

The sub-partitions are processed in the normal order irrespective of the intra mode and the split utilized, that is, the first sub-partition to be processed is the one containing the top-left sample of the CU and then continuing downwards (horizontal split) or to the right (vertical split), sequentially.

VTM 4.0 also supports intra prediction with multiple reference lines (MRL). A target block can choose to use among the first, the second, and the fourth reference lines whichever gives the best rate-distortion performance. The chosen reference line is signaled with a flag of one bit (0) or two bits (10 or 11) to indicate the first reference line, or between the second and the fourth reference lines, respectively. In VTM 4.0, ISP is applied only to the blocks employing the first reference line. Therefore, if a block has an MRL index other than 0, then the ISP coding mode will be inferred to be 0 and therefore it will not be sent to the decoder.

The ISP method has been tested with intra modes that are part of the MPM list, which consists of six distinct modes out of 67 prediction modes. For any block tested with ISP, the MPM list is modified to exclude the DC mode and to prioritize horizontal intra modes for the horizontal split and vertical intra modes for the vertical split.

The basic idea behind the wide-angle prediction is to adapt the prediction directions according to the block shape while keeping the total number of prediction modes the same. This is done by adding some prediction directions on the larger side of the block and reducing the prediction directions on the shorter side. The overall aim is to improve the prediction accuracy leading to higher compression efficiency. Since the newly introduced directions are beyond the usual range of 180 degrees from 45 degree to −135 degree angle, they are termed as wide-angle directions.

When the target block is square, the wide angles have no role to play since the defined modes for the block remain unchanged. When the target block is flat, that is, its width W is larger than its height H, some modes close to 45 degree are removed and an equal number of wide-angle modes beyond −135 degrees are added. The added directions are indexed as prediction modes 67, 68, . . . and so on. Similarly, when the target block is tall, some modes close to −135 degree are removed and an equal number of wide-angle modes beyond 45 degree are added. The added directions are indexed as prediction modes −1, −2, . . . and so on, as the prediction modes 0 and 1 are reserved for the PLANAR and DC predictions.

Since the direction of the secondary diagonal depends on the shape of the block, the total number of wide angles employed is dependent on the shape of a block. Table 2 shows the number of regular modes replaced by wide angle modes for different block shapes.

TABLE 2

Number of wide angular modes depending on the block shape

| W/H ratio | Range of intra prediction modes | No of wide angular modes | No of regular angular modes |
|---|---|---|---|
| 1 | 2:66 | 0 | 65 |
| 2 | 8:72 | 6 | 59 |
| 4 | 12:76 | 10 | 55 |
| 8 | 14:78 | 12 | 53 |
| 16 | 16:80 | 14 | 51 |
| 1/2 | −6:−1, 2:60 | 6 | 59 |
| 1/4 | −10:−1, 2:56 | 10 | 55 |
| 1/8 | −12:−1, 2:54 | 12 | 53 |
| 1/16 | −14:−1, 2:52 | 14 | 51 |

For any target block, the mapping from the replaced regular mode to the wide angle mode is done as follows:

```
modeShift[5] = {0, 6, 10, 12, 14};
ratio = Abs(Log2(W/H))
if W > H and 1 < predMode < 2 + modeShift[ratio]
    predMode = predMode + 65;
else if H > W and (66 − modeShift[ratio]) < predMode <= 66
    predMode = predMode − 67;
```

Figure 7:
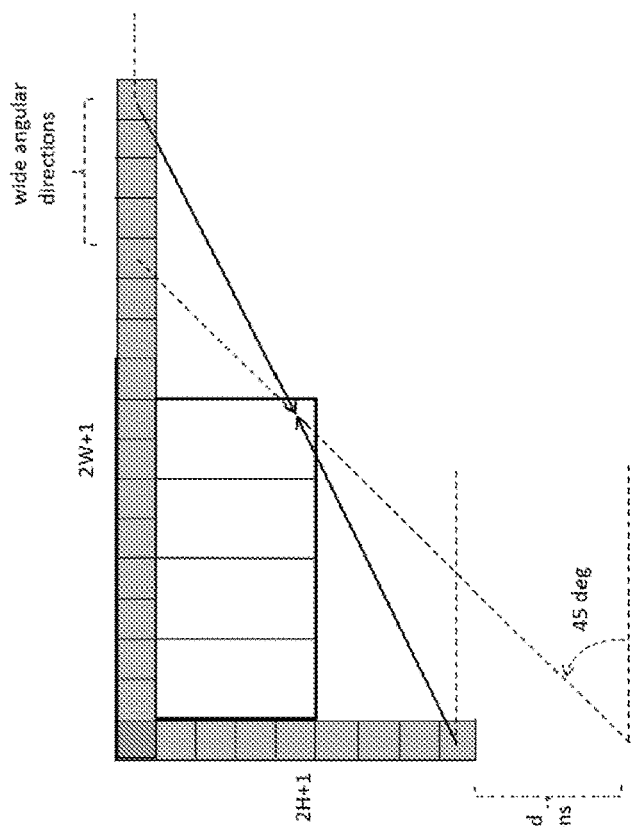
FIG. 7 shows ISP wide angle is computed from the CU height and width.
Figure 7:
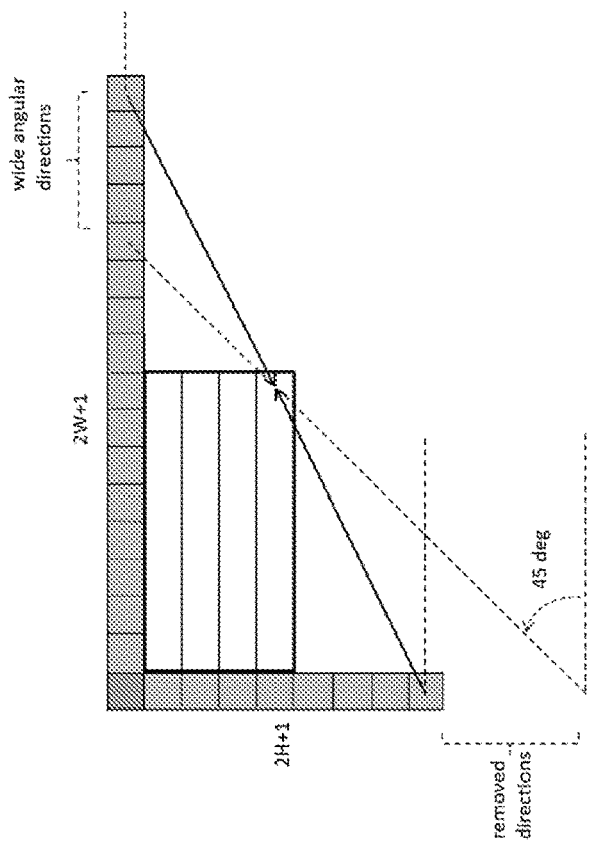

In the case of ISP, the mapping from the regular mode to the wide angle mode is done using the height and width of the parent CU, not the height and width of the sub-partition. Irrespective of if the new mode is a wide angle mode or a regular mode, the same mode is used for prediction in each sub-partition. This is illustrated by the examples in FIG. 7.

As showed above, the current approach to ISP with WAIP is to determine the prediction angle from the aspect ratio of the parent CU and use it for the prediction in each sub-partition. Since the sub-partitions are processed in order but independently, this constraint need not be binding. The second problem resulting from the individual sub-partition processing is the un-availability of some reference samples, which can affect the prediction in certain directions. We provide two solutions to these problems in the following.

For generality, in the following we will assume rectangular blocks having width W and height H. Square target blocks are special cases with W=H.

WAIP for Intra Sub-Partitions

Figure 8:
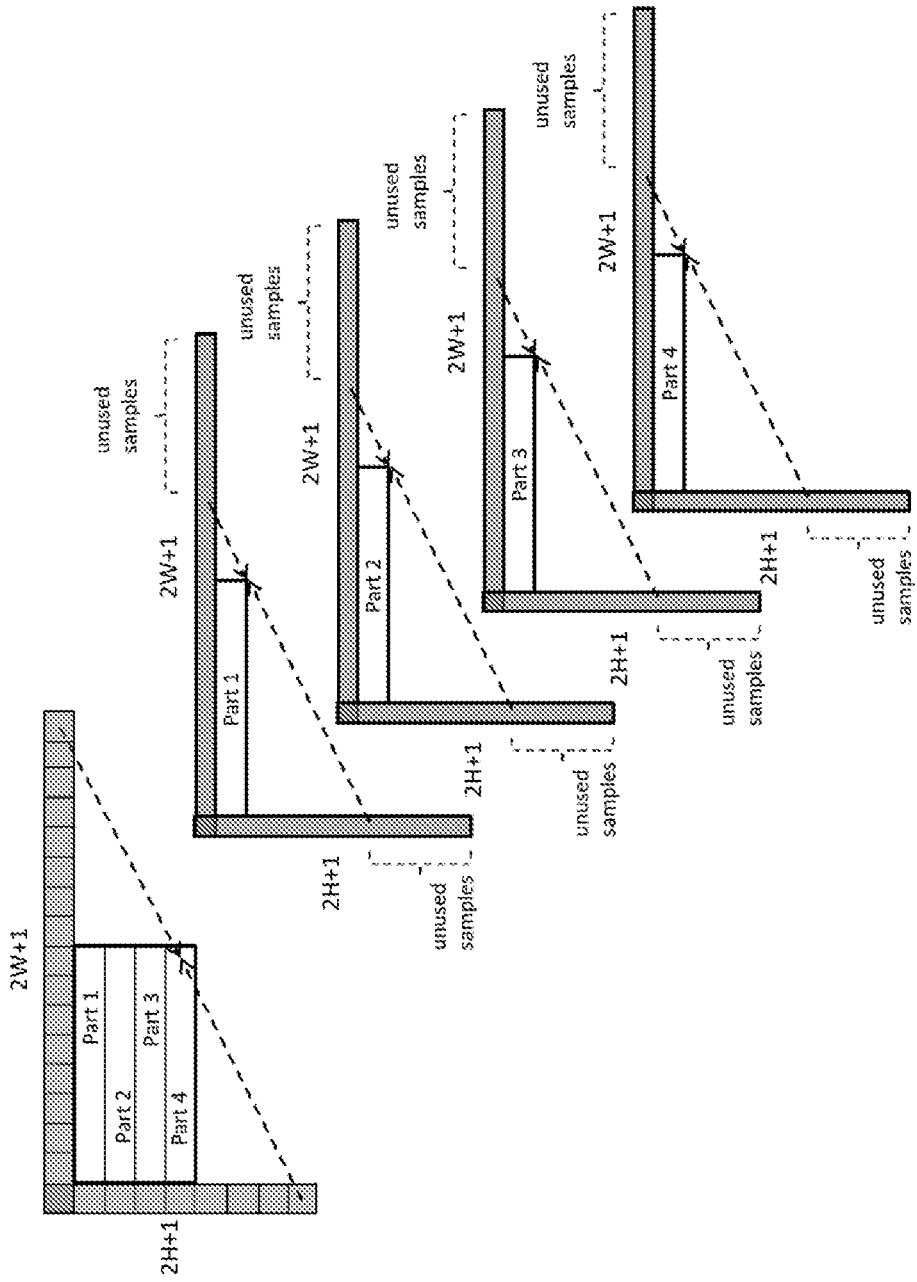
FIG. 8 shows used reference samples in the case of wide angle and horizontal split ISP.

For a block with ISP, the current VTM code (VTM 4.0) processes each sub-partition individually in the normal order. In the prediction process, the prediction tool first generates one reference array of samples on top, and one reference array of samples on the left, of the partition. If the ISP split is horizontal, the reference array on the top is constructed using the decoded samples in the last row of the previous sub-partition. Similarly, if the ISP split is vertical, the reference array on the left is constructed using the decoded samples in the last column of the previous sub-partition. This is shown in FIG. 8.

The current VTM code determines the sizes of the reference arrays for each partition from those required for the parent CU. We propose to determine the prediction direction from the dimensions of the sub-partitions. As an advantage for implementation, we propose to determine the lengths of the reference arrays for the partitions also from the dimensions of the partitions.

Let $W_p$ and $H_p$ denote the width and height of each partition. Then the lengths of the reference arrays on the top and left are determined as $2*W_p$ and $2*H_p$ respectively, excluding the top-left pixel.

Figure 9:
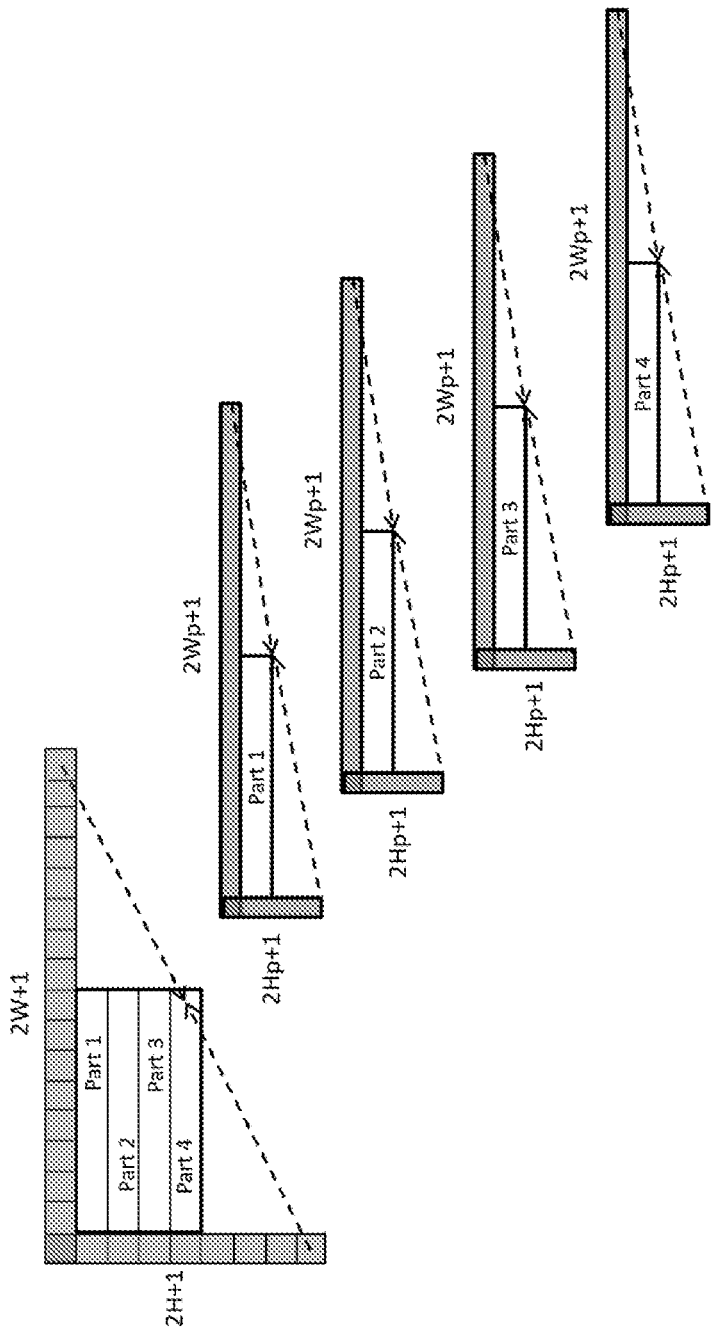
FIG. 9 shows an example of proposed arrays of reference samples for predicting sub-partitions.

For any sub-partition, as shown in FIG. 9, the mapping from the regular mode to the wide angle mode is done as follows:

```
modeShift[5] = {0, 6, 10, 12, 14};
whRatio = Abs(Log2(Wp/Hp))
if Wp > Hp and 1 < predMode < 2 + modeShift[whRatio]
    predMode = predMode + 65;
else if Hp > Wp and (66 − modeShift[whRatio]) < predMode <= 66
    predMode = predMode − 67;
```

The above mapping is valid as long as the aspect ratio of a sub-partition lies in the valid range as given in Table 2. If Wp/Hp>16 or Wp/Hp<1/16, we propose to use parent CU dimensions for wide angle derivation, as done in VTM.

In a simple variation of the above method, if the sub-partition is of square shape, that is, if Wp=Hp, then the usual prediction mode is applied, otherwise the wide angle is obtained using the dimensions of the CU. This simplification will avoid using wide angle prediction modes (derived from the parent rectangular CU) to square sub-partitions. In other words, the wide angle is derived from the sub-partition dimension only if the sub-partitions are square, else they are derived from the CU dimensions. Since, for a square shape, there are no wide angles, this is equivalent to having no wide angle derivation for square sub-partitions and keeping the wide angle derivations for rectangular sub-partitions intact. This is also presented in Embodiment 1 below.

Since all sub-partitions in ISP have equal dimensions, the wide angle mode computed for one sub-partition is the same for all sub-partitions.

Missing Reference Samples Substitution

Figure 10:
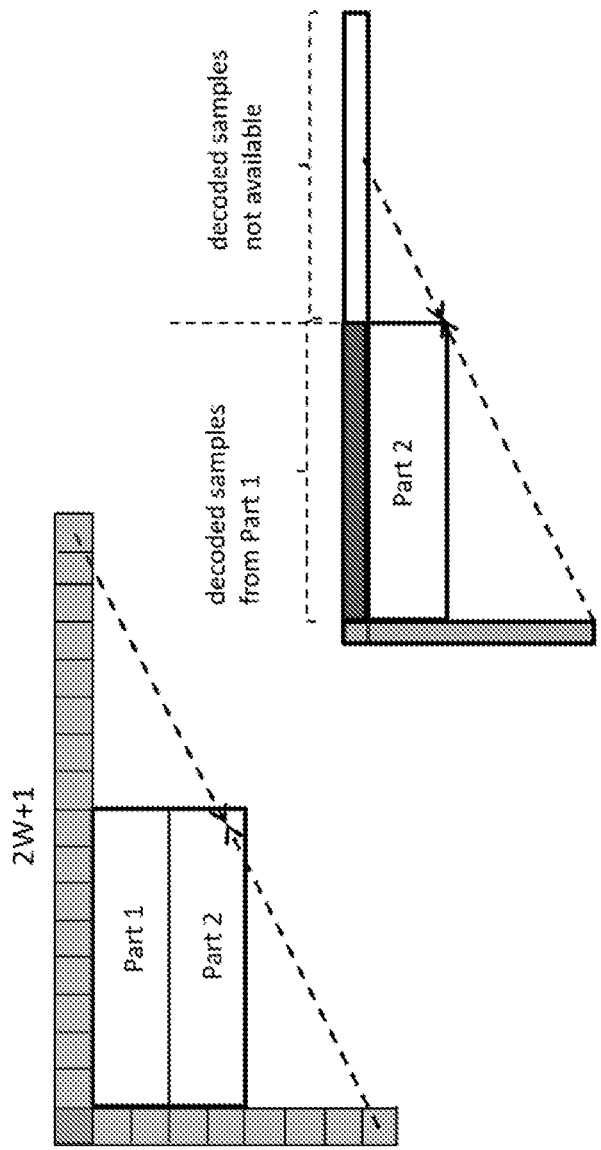
FIG. 10 shows one example of reference array padding in VTM for an exemplary case of two sub-partitions.

The second improvement to ISP lies in using reference samples from the top or left of the parent CU. Here assume that sub-partitions are processed in the normal order as in VTM 4.0. For horizontal split, the top reference samples of sub-partition 2 onwards use the decoded pixels from the previous sub-partition. Since the previous partition has the same width as the parent CU, the top right reference samples are simply not available. The current VTM codec will use padding in this case where the last reference pixel available will be repeated through the top-right portion of length W. This is illustrated in FIG. 10 for the case of two sub-partitions. A similar case applies in the vertical split where the bottom left reference samples will be missing for sub-partitions 2 onwards. In this case, the current VTM codec will use padding where the last reference pixel available will be repeated through the bottom-left portion of length H.

Figure 11:
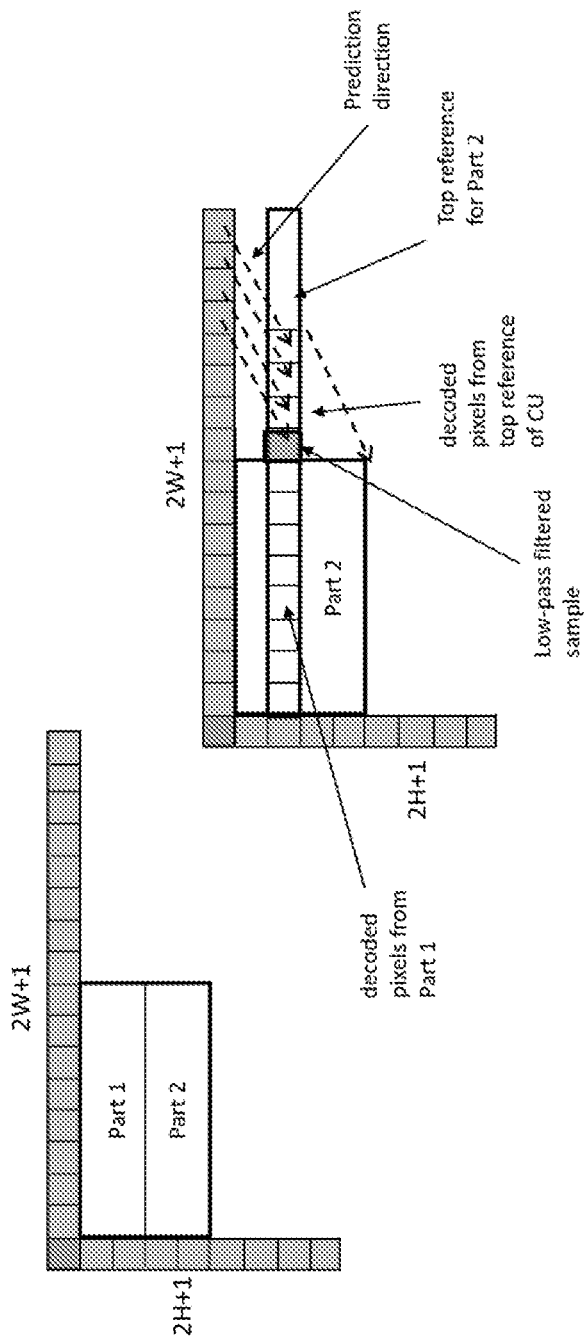
FIG. 11 shows reference sample mapping from a top reference of a coding unit in the case of horizontal split.

These missing reference samples can be substituted from the top reference of the parent CU, as illustrated in FIG. 11 for a horizontal split into two sub-partitions. That is, missing samples are mapped from the corresponding parent CU's reference array, following the prediction direction. If some reference samples are still missing even after the substitution process, the normal padding process can be applied where the last reference sample will be repeated to fill up the reference array.

Missing samples mapped from the corresponding parent CU's reference array, following the prediction direction can use the same interpolation process as the prediction (linear, 4-tap . . . ). For reducing the complexity, nearest neighbor can also be used (no interpolation). In the last case, it corresponds to shifting the reference samples by a number of pixels corresponding to the prediction angle.

This process of reference sample substitution has the undesired effect that it may produce intensity discontinuity at the position where pixels are copied from the top reference of parent CU. To alleviate this effect, a simple low-pass filter can be used. For example, we can use the 3-tap filter [1 2 1]/4.

Figure 12:
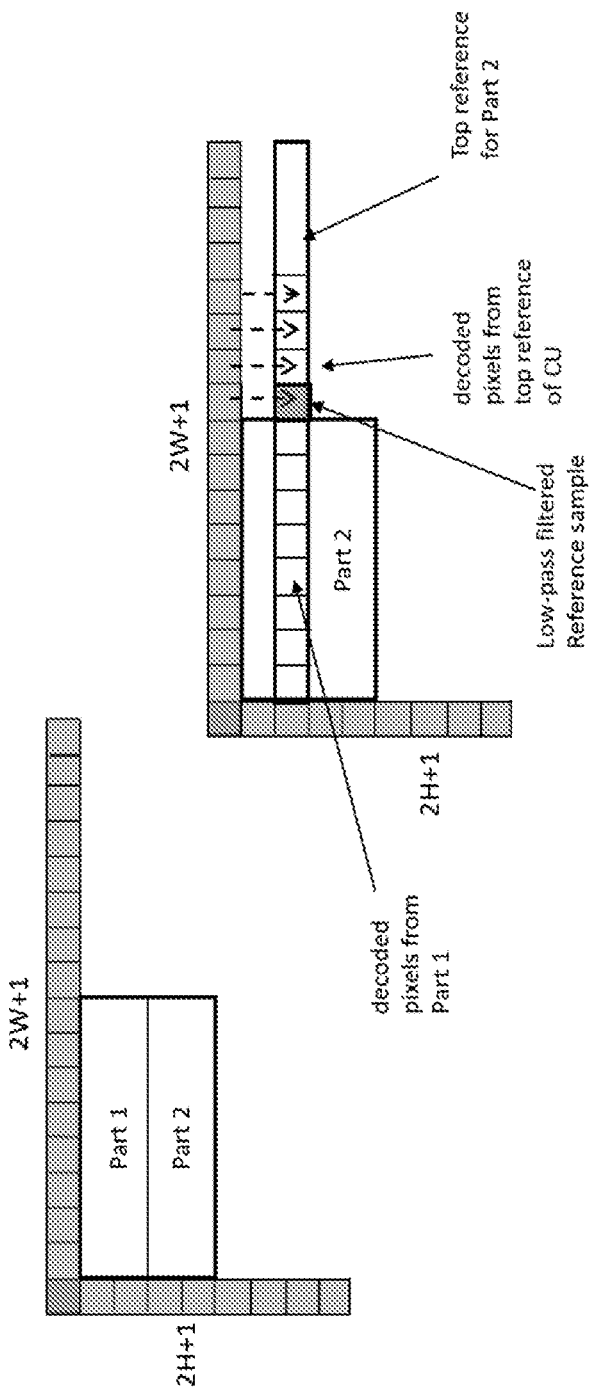
FIG. 12 shows reference sample mapping from a top reference of a coding unit in the case of horizontal split.

In FIG. 8, the mapped samples on the top reference are located along the prediction direction. Another method is to copy all the top right reference samples of the CU onto the top right reference samples of the second or subsequent sub-partitions, followed by a low-pass filtering at the top corner to alleviate the discontinuity. This is shown in FIG. 12.

This substitution process is independent of whether the WAIP modification in the previous section is applied or not. It can be applied without the WAIP modification for each sub-partition or can be applied together with it.

In the following, we assume any general video codec where ISP and WAIP are applied. VTM codec is one example of such a codec.

Embodiment 1: In this Embodiment, if a target block is split in ISP, for any prediction mode, we determine the wide angle using the dimensions of the parent CU unless the sub-partitions are of square shape. If the sub-partitions are of square shape, the regular prediction modes are applied to them without mapping to wide angles. All other codec parameters, as in VTM 4, remain unchanged.

Embodiment 2: In this Embodiment, if a target block is split in ISP, for any prediction mode, we determine the wide angle using the dimensions of the parent CU, as in VTM 4. But, from the second sub-partition onwards, we replace the missing reference samples on top right (bottom left) from the top (left) reference array of the parent CU for horizontal (vertical) split. The reference samples on the top (left) reference array are located along the prediction direction, as in FIG. 11. All other codec parameters, as in VTM 4, remain unchanged.

Embodiment 3: In this Embodiment, if a target block is split in ISP, for any prediction mode, we determine the wide angle using the dimensions of the parent CU, as in VTM 4. But, from the second sub-partition onwards, we replace the missing reference samples on top right (bottom left) from the top (left) reference array of the parent CU for horizontal (vertical) split. The reference samples on the top (left) reference array are directly copied onto the top-right (bottom left) part of the reference array for the second sub-partition onwards, as in FIG. 12. All other codec parameters, as in VTM 4.0, remain unchanged.

Embodiment 4: In this Embodiment, if a target block is split in ISP, for any prediction mode, we determine the wide angle using the dimensions of the parent CU unless the sub-partitions are of square shape. If the sub-partitions are of square shape, the regular prediction modes are applied to them without mapping to wide angles. In addition, from the second sub-partition onwards, we replace the missing reference samples on top right (bottom left) from the top (left) reference array of the parent CU for horizontal (vertical) split. The reference sample mapping is done as in Embodiment 2 or in Embodiment 3. All other codec parameters, as in VTM 4.0, remain unchanged.

Embodiment 5: In this Embodiment, if a target block is split in ISP, for any prediction mode, we determine the wide angle using the dimensions of the sub-partition than the dimension of the parent CU. If the width-to-height ratio (Wp/Hp) of a sub-partition is greater than 16 or less than $\frac{1}{16}$, we will use the W/H ratio of the parent CU for computing the wide angle and use it for all sub-partitions. In addition, from the second sub-partition onwards, we replace the missing reference samples on top right (bottom left) from the top (left) reference array of the parent CU for horizontal (vertical) split. The reference samples on the top (left) reference array are located along the prediction direction, as in FIG. 11. All other codec parameters, as in VTM 4.0, remain unchanged. In order to speed up the prediction step, the reference arrays can be used for the sub-partitions with twice their dimensions than twice the dimensions of the parent CU. When using the CU dimensions, the original reference array lengths can be kept intact.

Embodiment 6: In this Embodiment, if a target block is split in ISP, for any prediction mode, we determine the wide angle using the dimensions of the sub-partition than the dimension of the parent CU. If the width-to-height ratio (Wp/Hp) of a sub-partition is greater than 16 or less than $\frac{1}{16}$, we will use the W/H ratio of the parent CU for computing the wide angle and use it for all sub-partitions. In addition, from the second sub-partition onwards, we replace the missing reference samples on top right (bottom left) from the top (left) reference of the parent CU for horizontal (vertical) split. The reference samples on the top (left) reference array are directly copied onto the top-right (bottom left) part of the reference array for the second sub-partition onwards, as in FIG. 12. All other codec parameters, as in VTM 4.0, remain unchanged. In order to speed up the prediction step, the reference arrays can be used for the sub-partitions with twice their dimensions than twice the dimensions of the parent CU. When using the CU dimensions, the original reference array lengths can be kept intact.

Embodiment 7: VTM 4.0 uses ISP with either 2 or 4 sub-partitions with the condition that each sub-partition must have a minimum of 16 pixels. In this Embodiment we relax these constraints and apply ISP to all block shapes with the condition that each sub-partition can be at least a single row or a single column. Depending on the CU size, the number of sub-partitions in a CU can also be higher such as 8 or 16 or 32. AI the sub-partitions are constrained to be identical in shape irrespective of horizontal or vertical split. If the width-to-height ratio (Wp/Hp) of a sub-partition is greater than 16 or less than $\frac{1}{16}$, we will use the W/H ratio of the parent CU for computing the wide angle and use it for all sub-partitions. From the second sub-partition onwards, we replace the missing reference samples on top right (bottom left) from the top (left) reference of the parent CU for horizontal (vertical) split. The mapping of missing samples is done as in Embodiment 2 or Embodiment 3.

Embodiment 8: In this Embodiment we relax the constraint that all sub-partitions must have identical shapes. The sub-partitions can have unequal shapes but are constrained to have height and width as powers of 2. Thus, the number of sub-partitions need not be a power of two as in Embodiments 1-7. For example, a 8×8 block can be split into three partitions of size 4×8, 2×8, and 2×8. Any of the Embodiments 1-7 can be changed accordingly.

Embodiment 9: VTM 4.0 uses ISP over blocks which do not use MRL. In this embodiment we relax that constraint. In a general case, ISP can be applied even if the CU uses multiple reference lines. In one variation, only the first sub-partition can use MRL if the split is horizontal and the prediction direction is vertical, or if the split is vertical and the prediction direction is horizontal. In another variation, all sub-partitions can use MRL irrespective of the split type and the prediction direction. In all these variations, we can use any one of Embodiment 1 through 8 for computing the wide angles for sub-partitions and/or for mapping the missing reference samples from the second sub-partition onwards.

Embodiment 10: VTM 4.0 uses ISP only over the Luma component. In this embodiment we relax this constraint and apply any of the embodiments 1-9 to both the luma and the chroma components.

The proposed wide angle mode derivation with ISP was implemented as in Embodiment 1 by incorporating the changes in VTM 4.0 reference software. The test was performed with one frame from the JVET test sequences under ALL-Intra (AI) configuration. The BD-rate performance of the tested method with respect to VTM 4.0 anchor results are shown in Table 3. Observe that, without any added encoder or decoder complexity, the Luma BD-rate improves by 0.04%. The gain for Class-C and Class-E sequences is noteworthy with 0.11% for Luma.

TABLE 3

BD-rate performance of Embodiment 1 compared to VTM 4.0 anchor with one frame from JVET test sequences in AI configuration.

| | Over VTM-4.0 | | | | |
| --- | --- | --- | --- | --- | --- |
| | Y | U | V | EncT | DecT |
| Class A1 | 0.04% | −0.11% | −0.34% | 97% | 98% |
| Class A2 | −0.01% | −0.21% | −0.05% | 94% | 93% |
| Class B | −0.01% | 0.04% | −0.25% | 96% | 96% |
| Class C | −0.11% | −0.02% | 0.10% | 97% | 95% |
| Class E | −0.11% | −0.67% | −0.51% | 94% | 93% |
| Overall | −0.04% | −0.16% | −0.20% | 96% | 95% |
| Class D | −0.09% | −0.42% | −0.23% | 95% | #DIV/0! |
| Class F (optional) | 0.05% | −0.20% | 0.06% | 93% | 91% |

The general aspects described her aim at improving the intra prediction efficiency in ISP by changing the wide angle derivation and by substituting missing reference samples for some sub-partitions with those from the reference samples of the parent CU. One of the advantages is the higher compression efficiency without much additional complexity.

Figure 13:
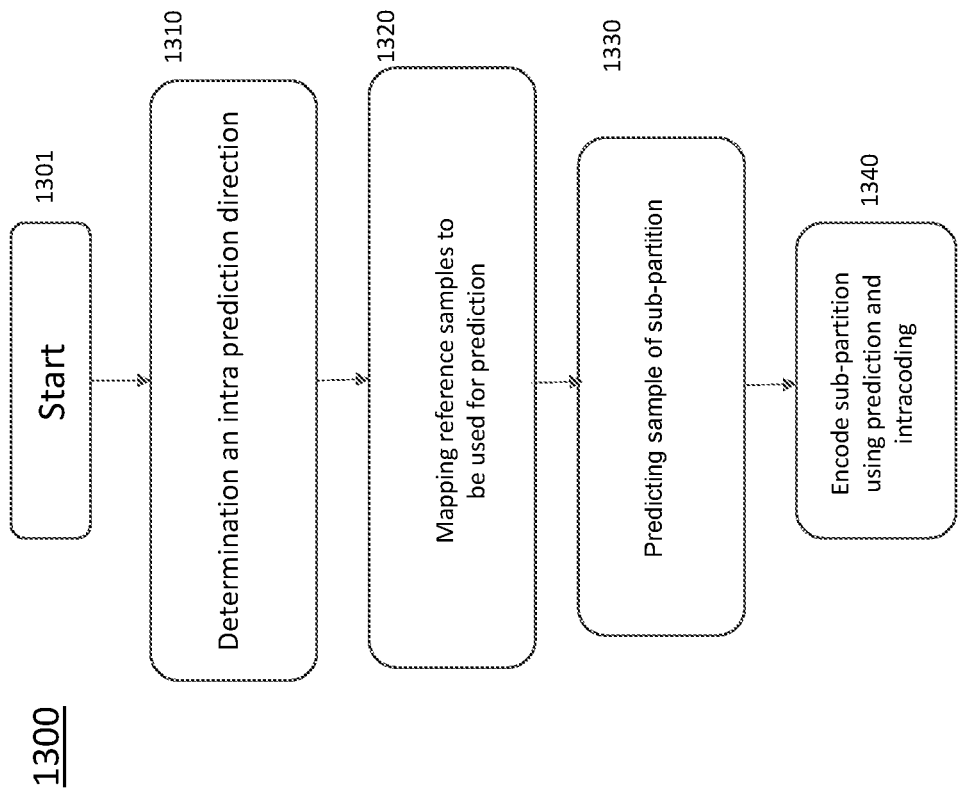
FIG. 13 shows a generic, standard encoding scheme.

One embodiment of a method 1300 for encoding a block of video data using the general aspects described here is shown in FIG. 13. The method commences at Start block 1301 and control proceeds to function block 1310 for determining an intra prediction direction for a rectangular sub-partition of a video block based on the dimensions of the sub-partition when a ratio of dimensions of the sub-partition is within a particular range, and based on dimensions of the video block when a ratio of dimensions of the sub-partition is out of the particular range. Control then proceeds from block 1310 to block 1320 for mapping reference samples from above right or below left of the video block as above right or below left reference samples for prediction of the sub-partition of the video block. Control proceeds from block 1320 to block 1330 for predicting a sample of the rectangular sub-partition using reference samples from a row above the video block or reference samples from a column left of the video block, wherein a number of reference samples in the row above the video block or the column left of the video block are determined based on dimensions of the rectangular sub-partition. Control proceeds from block 1330 to block 1340 for encoding the video block using the prediction in an intra coding mode.

Figure 14:
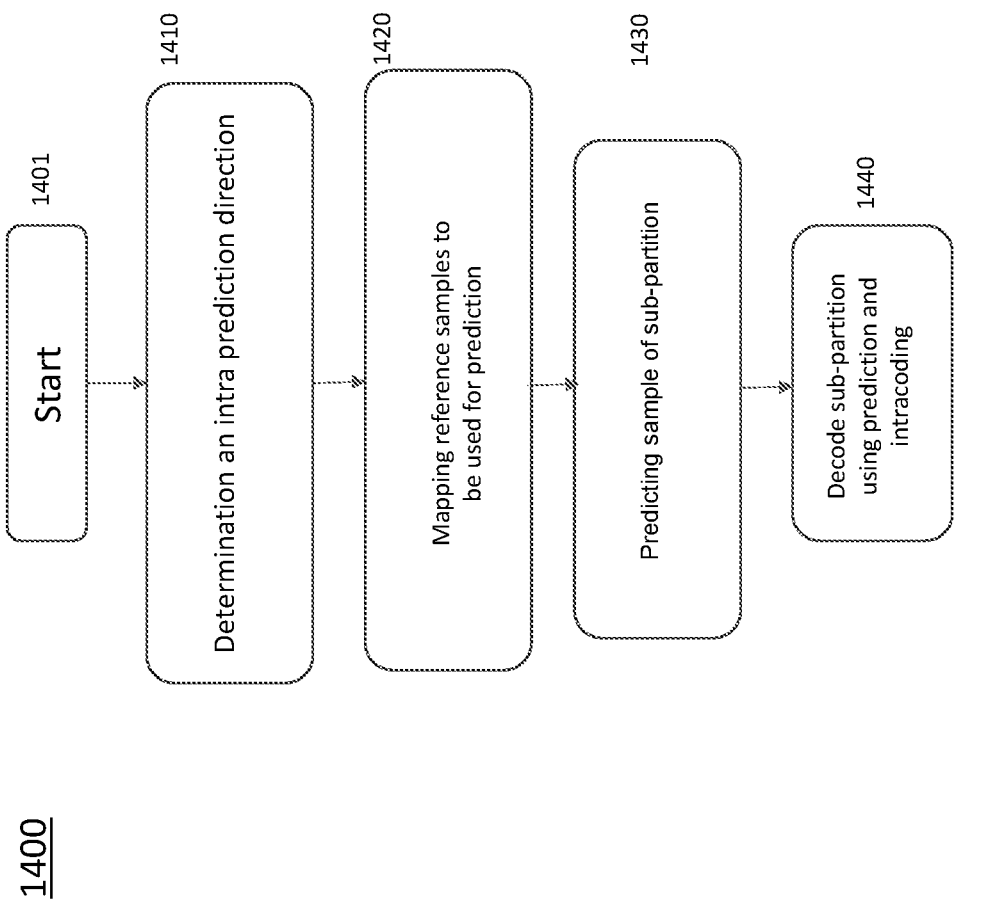
FIG. 14 shows a generic, standard decoding scheme.

One embodiment of a method 1400 for decoding a block of video data using the general aspects described here is shown in FIG. 14. The method commences at Start block 1401 and control proceeds to function block 1410 for determining an intra prediction direction for a rectangular sub-partition of a video block based on the dimensions of the sub-partition when a ratio of dimensions of the sub-partition is within a particular range, and based on dimensions of the video block when a ratio of dimensions of the sub-partition is out of the particular range. Control then proceeds from block 1410 to block 1420 for mapping reference samples from above right or below left of the video block as above right or below left reference samples for prediction of the sub-partition of the video block. Control proceeds from block 1420 to block 1430 for predicting a sample of the rectangular sub-partition using reference samples from a row above the video block or reference samples from a column left of the video block, wherein a number of reference samples in the row above the video block or the column left of the video block are determined based on dimensions of the rectangular sub-partition. Control proceeds from block 1430 to block 1440 for encoding the video block using the prediction in an intra coding mode.

Figure 15:
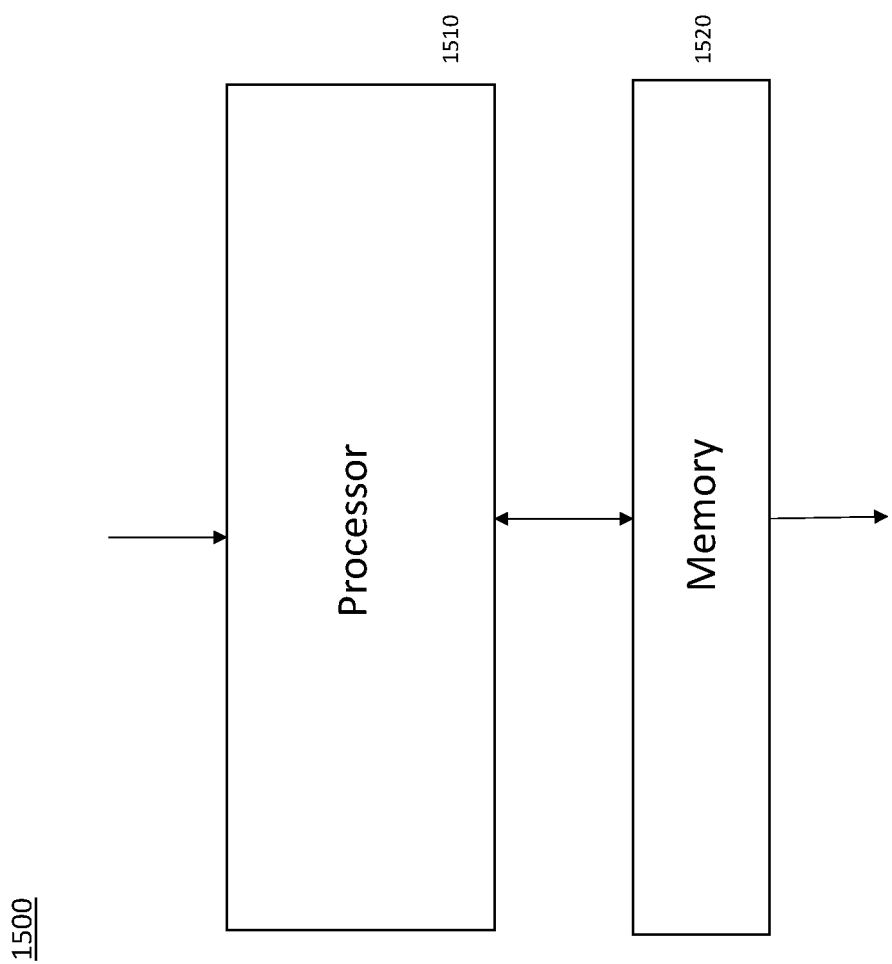
FIG. 15 shows a typical processor arrangement in which the described embodiments may be implemented.

FIG. 15 shows one embodiment of an apparatus 1500 for encoding or decoding a block of video data. The apparatus comprises Processor 1510 and can be interconnected to a memory 1520 through at least one port. Both Processor 1510 and memory 1520 can also have one or more additional interconnections to external connections.

Processor 1510 is configured to either encode or decode video data using an intra prediction mode with sub-partitions and, either encoding or decoding the block of video data using intra prediction mode with sub-partitions.

The general aspects described aim to improve the intra prediction efficiency through intra prediction with sub-partitions and the necessary changes required for these modes. The advantage is the higher compression efficiency without much additional complexity.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 16:
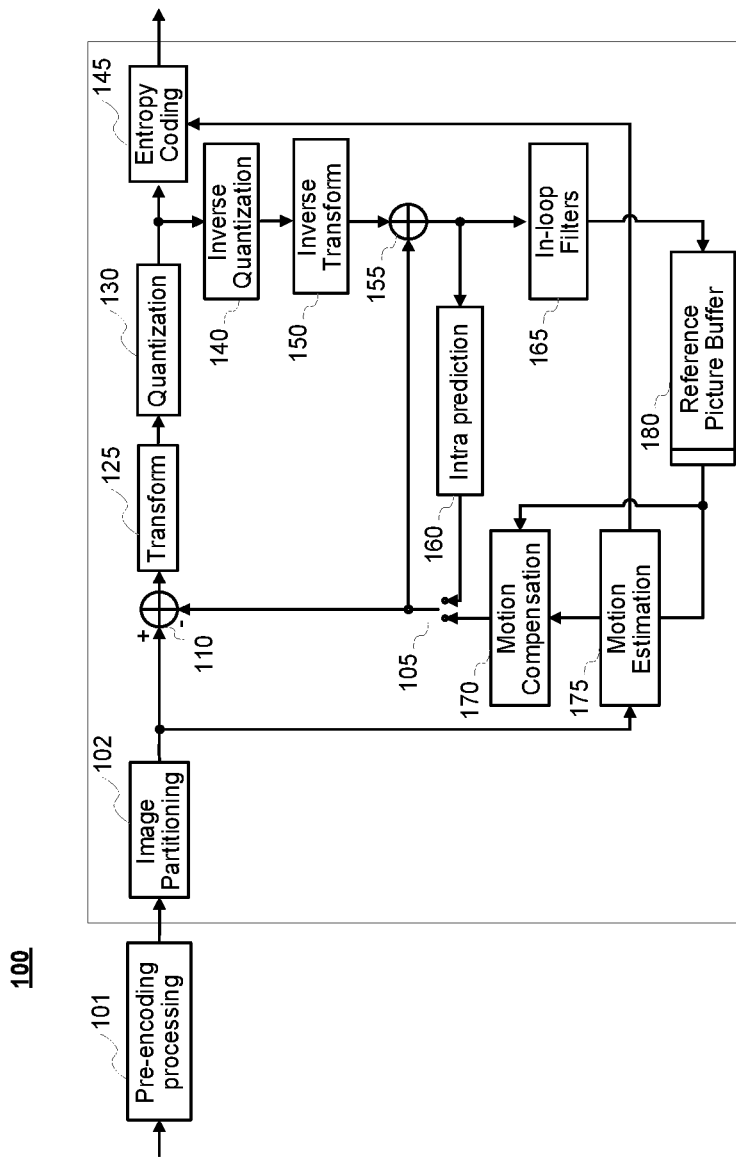
FIG. 16 shows a generic, standard encoding scheme.
Figure 17:
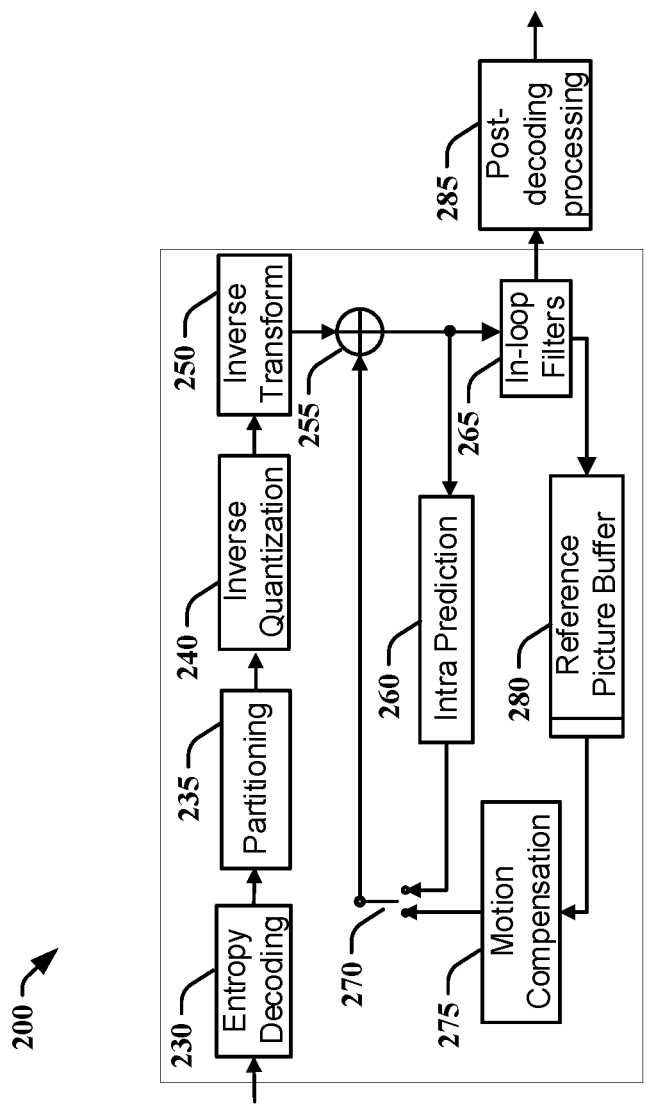
FIG. 17 shows a generic, standard decoding scheme.
Figure 18:
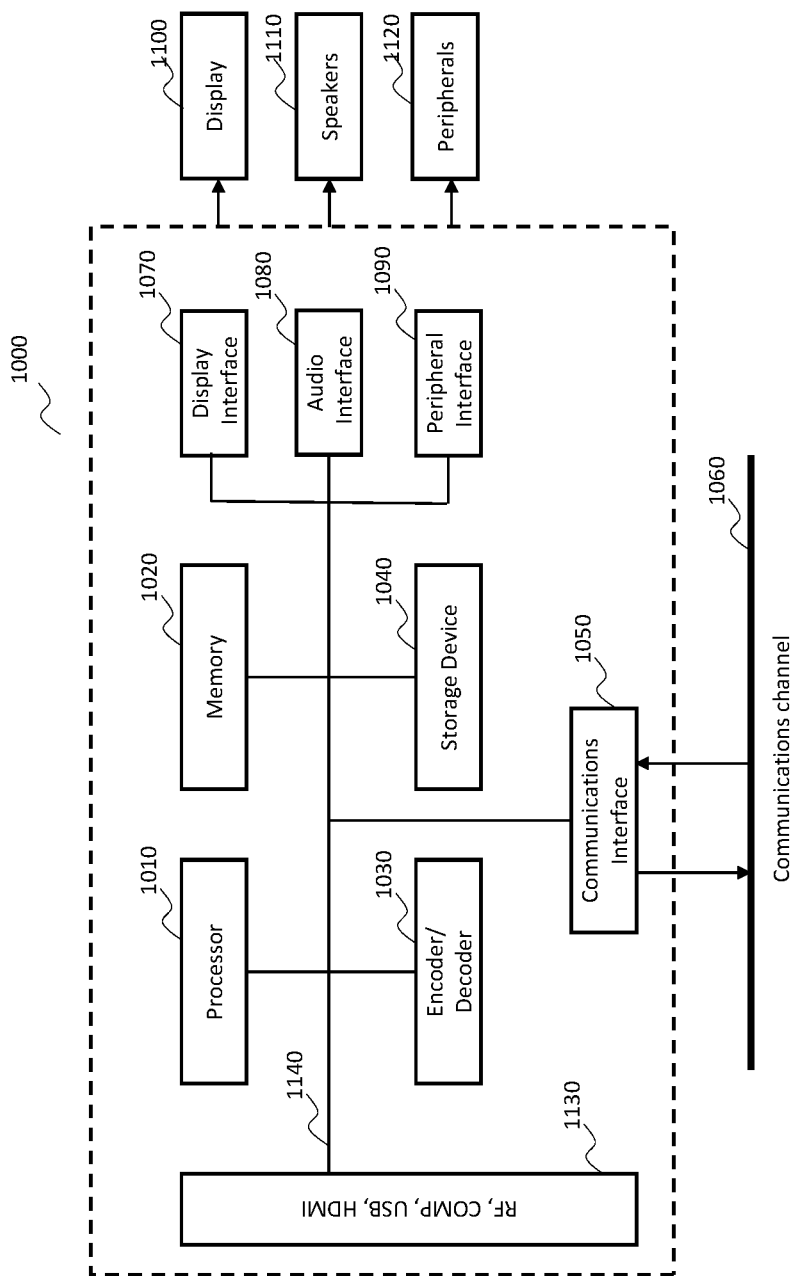
FIG. 18 shows a typical processor arrangement in which the described embodiments may be implemented.

The aspects described and contemplated in this application can be implemented in many different forms. FIGS. 16, 17, and 18 provide some embodiments, but other embodiments are contemplated and the discussion of FIGS. 16, 17, and 18 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIGS. 16, 17, and 18. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 16 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 17 illustrates a block diagram of a video decoder 200. In the decoder 200, a bitstream is decoded by the decoder elements as described below. Video decoder 200 generally performs a decoding pass reciprocal to the encoding pass as described in FIG. 16. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 18 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 18, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to perform intra encoding and decoding with intra coding sub-partitions.

A process or device to perform intra encoding and decoding with intra coding sub-partitions using multiple reference lines.

A process or device to perform intra encoding and decoding with intra coding sub-partitions and missing sample substitution.

A process or device to perform intra encoding and decoding with intra coding sub-partitions and mapping of reference pixels above a parent video block.

A process or device to perform intra encoding and decoding with intra coding sub-partitions and unequal sub-partition sizes.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
   determining an intra prediction direction for a rectangular sub-partition of a video block based on dimensions of the rectangular sub-partition when a ratio of dimensions of said rectangular sub-partition is within a particular range, and based on dimensions of the video block when a ratio of dimensions of said rectangular sub-partition is out of said particular range, wherein sub-partitions of the video block can have unequal shapes but have height and width equal to a power of two;
   mapping reference samples from above right or below left of the video block as above right or below left reference samples for prediction of said rectangular sub-partition of the video block;
   predicting a sample of the rectangular sub-partition using reference samples from a row above the video block or reference samples from a column left of the video block, wherein a number of reference samples in a row above the video block or a column left of the video block are determined based on dimensions of the rectangular sub-partition; and,
   encoding the rectangular sub-partition of a video block using said prediction in an intra coding mode.

2. An apparatus, comprising:
   a processor, configured to perform:
   determining an intra prediction direction for a rectangular sub-partition of a video block based on dimensions of the rectangular sub-partition when a ratio of dimensions of said rectangular sub-partition is within a particular range, and based on dimensions of the video block when a ratio of dimensions of said rectangular sub-partition is out of said particular range, wherein sub-partitions of the video block can have unequal shapes but have height and width equal to a power of two;
   mapping reference samples from above right or below left of the video block as above right or below left reference samples for prediction of said rectangular sub-partition of the video block;
   predicting a sample of the rectangular sub-partition using reference samples from a row above the video block or reference samples from a column left of the video block, wherein a number of reference samples in a row above the video block or a column left of the video block are determined based on dimensions of the rectangular sub-partition; and,
   encoding the rectangular sub-partition of a video block using said prediction in an intra coding mode.

3. A method, comprising:
   determining an intra prediction direction for a rectangular sub-partition of a video block based on dimensions of the rectangular sub-partition when a ratio of dimensions of said rectangular sub-partition is within a particular range, and based on dimensions of the particular range, wherein sub partitions of the video block can have unequal shapes but have height and width equal to a power of two;
   mapping reference samples from above right or below left of the video block as above right or below left reference samples for prediction of said rectangular sub-partition of the video block;
   predicting a sample of the rectangular sub-partition using reference samples from a row above the video block or reference samples from a column left of the video block, wherein a number of reference samples in a row above the video block or a column left of the video block are determined based on dimensions of the rectangular sub-partition; and, decoding the rectangular sub-partition of a video block using said prediction in an intra coding mode.

4. An apparatus, comprising:

a processor, configured to perform:

determining an intra prediction direction for a rectangular sub-partition of a video block based on dimensions of the rectangular sub-partition when a ratio of dimensions of said rectangular sub-partition is within a particular range, and based on dimensions of the video block when a ratio of dimensions of said rectangular sub-partition is out of said particular range, wherein sub-partitions of the video block can have unequal shapes but have height and width equal to a power of two;

mapping reference samples from above right or below left of the video block as above right or below left reference samples for prediction of said rectangular sub-partition of the video block;

predicting a sample of the rectangular sub-partition using reference samples from a row above the video block or reference samples from a column left of the video block, wherein a number of reference samples in a row above the video block or a column left of the video block are determined based on dimensions of the rectangular sub-partition; and, decoding the rectangular sub-partition of a video block using said prediction in an intra coding mode.

5. The method of claim 1, wherein non-wide angle prediction modes are applied to sub-partitions that are square.

6. The method of claim 1, wherein for sub-partitions beyond those closest to a left reference array for vertical sub-partitions or beyond those closest to a top edge for horizontal sub-partitions, missing reference samples are mapped from the video block.

7. The method of claim 6, wherein the intra prediction direction is based on dimensions of the video block for a sub-partition with width/height ratio greater than 16 or less than 1/16.

8. A method, comprising:

determining an intra prediction direction for a rectangular sub-partition of a video block based on dimensions of the sub-partition when a ratio of dimensions of said sub-partition is within a particular range, and based on dimensions of the video block when a ratio of dimensions of said sub-partition is out of said particular range;

mapping reference samples from above right or below left of the video block as above right or below left reference samples for prediction of said sub-partition of the video block;

predicting a sample of the rectangular sub-partition using reference samples from a row above the video block or reference samples from a column left of the video block, wherein a number of reference samples in a row above the video block or a column left of the video block are determined based on dimensions of the rectangular sub-partition; and, encoding the rectangular sub-partition of a video block using said prediction in an intra coding mode, wherein the intra prediction direction is based on dimensions of the video block for a sub-partition with width/height ratio greater than 16 or less than 1/16 and wherein for sub-partitions beyond those closest to a left reference array for vertical sub-partitions or beyond those closest to a top edge for horizontal sub-partitions, missing reference samples are mapped directly horizontally or vertically from the video block.

9. The method of claim 6, wherein a sub-partition is at least a single row or a single column of the video block.

10. The method of claim 1, wherein a sub-partition can use multiple reference lines.

11. A device comprising:

an apparatus according to claim 4; and at least one of (i) an antenna configured to receive a signal, the signal including the video block, (ii) a band limiter configured to limit the received signal to a band of frequencies that includes the video block, and (iii) a display configured to display an output representative of a video block.

12. A non-transitory computer readable medium containing data content generated according to the method of claim 1, for playback using a processor.

13. A non-transitory computer program product comprising instructions which, when the program is executed by a computer, cause the computer to carry out the method of claim 3.

14. The method of claim 3, wherein non-wide angle prediction modes are applied to sub-partitions that are square.

15. The method of claim 3, wherein for sub-partitions beyond those closest to a left reference array for vertical sub-partitions or beyond those closest to a top edge for horizontal sub-partitions, missing reference samples are mapped from the video block.

16. The method of claim 3, wherein the intra prediction direction is based on dimensions of the video block for a sub-partition with width/height ratio greater than 16 or less than 1/16.

17. The non-transitory computer program product of claim 13, wherein non-wide angle prediction modes are applied to sub-partitions that are square.

18. The non-transitory computer program product of claim 13, wherein for sub-partitions beyond those closest to a left reference array for vertical sub-partitions or beyond those closest to a top edge for horizontal sub-partitions, missing reference samples are mapped from the video block.

19. The non-transitory computer program product of claim 13, wherein the intra prediction direction is based on dimensions of the video block for a sub-partition with width/height ratio greater than 16 or less than 1/16.

* * * * *